United States Patent [19]
O'Connell

[11] 4,027,582
[45] June 7, 1977

[54] ART OF BREWING INDIVIDUAL SERVINGS OF COFFEE IN A CUP

[76] Inventor: Gerard Peter O'Connell, 10 Bemis Road, Holyoke, Mass. 01040

[22] Filed: Jan. 19, 1976

[21] Appl. No.: 650,556

[52] U.S. Cl. .............................................. 99/306
[51] Int. Cl.² ...................................... A47J 31/00
[58] Field of Search ............. 99/295, 304, 317, 306

[56] References Cited
UNITED STATES PATENTS 2,716,937  9/1955  Milano ................................ 99/306
3,139,344  6/1964  Weisman ............................ 99/295

FOREIGN PATENTS OR APPLICATIONS 1,029,946  3/1953  France ................................ 99/295
1,289,610  2/1962  France ................................ 99/295

*Primary Examiner*—Edward J. McCarthy
*Attorney, Agent, or Firm*—Ross, Ross & Flavin

[57] ABSTRACT

A drip coffee maker which makes an aqueous infusion which has a water inlet control means for controlling the entry of water into a brewing chamber from an upper hot water chamber.

1 Claim, 5 Drawing Figures

ART OF BREWING INDIVIDUAL SERVINGS OF COFFEE IN A CUP

BACKGROUND OF THE INVENTION

1. FIELD OF THE INVENTION

This invention is directed to a drip beverage maker for producing a beverage.

2. DESCRIPTION OF THE PRIOR ART

Coffee making methods in common use today are by way of percolation and of drip.

The percolation method envisions flowing boiling water rapidly upwardly through a tube and then onto and through a charge of coarse coffee contained within a perforated container, the cycle being repeated to obtain sufficient brew strength.

The drip method envisions use of a perforated basket for holding the ground coffee and a perforated cover for distributing the water uniformly over the coffee, the water passing through the coffee and into such as a cup therebelow.

SUMMARY OF THE INVENTION

It is directed to a coffee maker which is optimally and critically designed to provide a desirable aqueous coffee infusion using the drip method. The coffee maker has a coffee brewing chamber with outlets so as to retain all of the coffee ground fines and yet pass the aqueous coffee infusion at a satisfactory rate. Furthermore, the coffee chamber has controlled water inlet slots so that water enters the coffee chamber at the desired rate to wet the coffee grounds without substantially floating them, thus to prevent selective settling of the fines on the outlet filter.

Accordingly, it is an object of this invention to provide a coffee maker which is easily and economically constructed so that the coffee maker is available for the ready brewing of a coffee infusion. It is a further object to provide a coffee maker which closely controls the inlet of water to the coffee chamber so that drip type or fine type coffee grinds can be utilized in making an aqueous coffee infusion. It is a further object to provide a drip coffee maker which has a coffee chamber therein having an outlet filter and controlled water inlet channel so that water is permitted to enter therein at an appropriate rate to obtain an optimum coffee infusion. It is still another object to provide a coffee maker which can be constructed in a convenient size to drip brew a single cup of coffee, thus to provide the pleasure of freshly-brewed drip extracted coffee on a single cup basis.

The principal object of the invention is to provide a simple and inexpensive device by means of which a beverage or other hot liquid food may be produced by percolation in a cup, glass or other similar receptacle in order that the user may be assured of a pleasant drink of such as coffee.

The invention further contemplates a device of the character described which may be readily freed of the residue and the elements thereof properly cleansed after use.

With the above recited and other objects in view, the invention resides in the novel construction set forth in the following specification, particularly pointed out in the appended claim and illustrated in the accompanying drawing, it being understod that the right is reserved to embodiments other than those actually illustrated herein to the full extent indicated by the general meaning of the terms in which the claim is expressed.

DESCRIPTION OF THE PREFERRED EMBODIMENT

Figure 1:
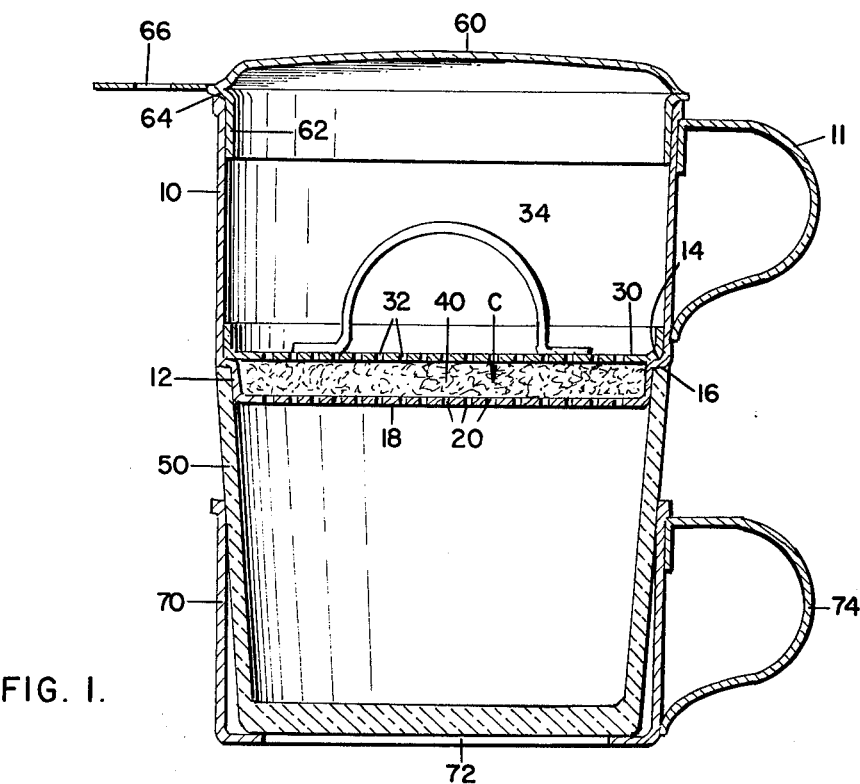
FIG. 1 is a vertical sectional view illustrating the drip device of the invention.
Figure 2:
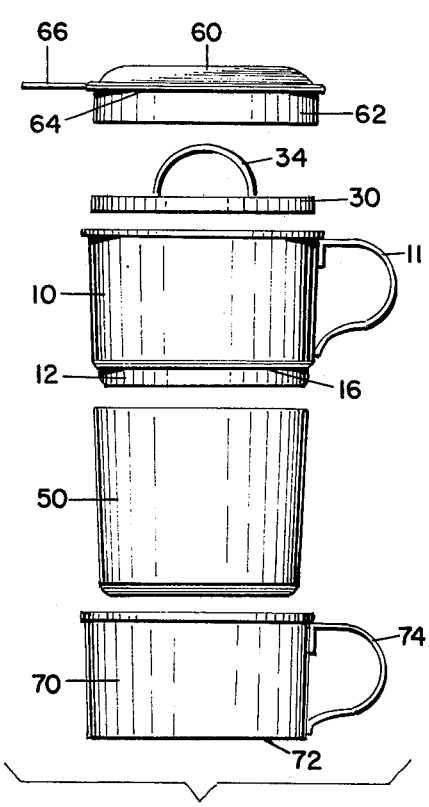
FIG. 2 is an exploded view in side elevation showing the relationship of the components of the invention.
Figure 3:
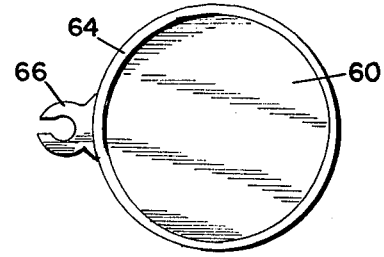
FIG. 3 is a top plan view of the cover of the invention.
Figure 4:
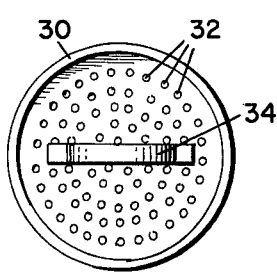
FIG. 4 is a top plan view of the brew chamber cover of the invention.
Figure 5:
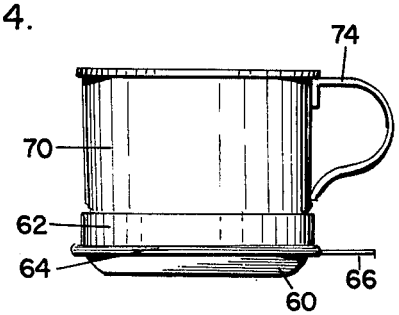
FIG. 5 is a view in side elevation of the cup seated upon the cover of the invention.

The drip coffee maker comprises a substantially cylindrical housing or body 10 having a lower end 12 of reduced circumferential dimension to provide an internal annular shoulder 14 and an external annular shoulder 16.

The lower end of body 10 is closed by a horizontally-extending bottom wall 18 formed with a multiplicity of through openings 20.

A partition 30, provided with a plurality of through openings 32, is of an appropriate size so as to fit snugly within the upper enlarged portion of body 10 and rest upon internal shoulder 14, thereby to be held in spaced relation to bottom wall 18. The partition is provided with a handle 34.

Bottom wall 18, reduced end 12, and partition 30 cooperantly define a chamber 40 for the reception therewithin of a beverage producing substance C, such as coffee, whereby when hot water or liquid is introduced through the upper open end of body 10, the same will gravitate downwardly through openings 32 in partition 30, drip through substance C, and thence through openings 20 in bottom 18 to extract the essence of the substance and produce the beverage.

To facilitate handling, body 10 is preferentially provided with a handle 11.

The lower reduced end 12 of body 10 is of an appropriate size to snugly fit within the upper end of a cup 50 which may, if desired, be made of glass, in order that the beverage will be directly received therein for use.

A suitable closure 60 is provided for disposition over the upper end of body 10, being formed with a downwardly depending annular lip 62 receivable within the mouth of the body and defining an annular shoulder 64 which may seat on the upper rim of the body when in operational position.

The closure may additionally be provided with a handle 66 for purposes to be explained.

An annular glass receiving supporting cup 70 may be provided into which glass or cup 50 may be receivable, and includes a bottom wall 72 and a handle 74.

In use and operation, when coffee or other beverage is to be served, the substance is charged into the lower reduced end 12 of body 10 and partition 30 is arranged thereover.

The device is arranged and supported in the upper end of the cup and boiling water is poured into the body 10 after which the closure or cover is arranged in situ.

Thus the coffee may be left standing an appropriate length of time to permit the dripping of the water through the ground coffee, after which the device is removed by means of the handle.

This insures to the user a fresh hot cup of coffee.

The dripper, when removed from the table, is readily freed of the coffee grounds or residue by removing the closure or cover and the partition, wherefore all components may be readily cleansed and washed for subsequent reuse.

The closure 60 may be inverted for purposes of receiving, within the flange 62, the supporting cup 70 and glass 50 when desired to use it at the table.

I claim:

1. An individual coffee maker comprising:

a cylindrical body having a handle and a perforated bottom and having its lower end portion reduced in diameter for the reception of a beverage producing substance, a perforated partition seatable in spaced relation to the perforated bottom over the lower end portion of the body, a cover removably seated on the body, a handle on the cover, a beverage cup positionable below the body for receiving the beverage dripped through the lower perforated bottom wall of the body and supporting the body, a supporting cup having a handle and adapted to receive the beverage cup therein, the body, partition, and cover being removable from the beverage cup by grasping the handle on the body, and the cover being adapted to be removed from the body, inverted, and disposed below the supporting cup in the manner of a saucer, the handle on the cover facilitating such removal and inversion.

* * * * *